United States Patent [19]

Calvet et al.

[11] 4,342,232

[45] Aug. 3, 1982

[54] VORTEX FLOW RATE MEASURING DEVICE

[75] Inventors: Pierre Calvet, Toulouse; Gil Ching, Paris; Philippe Rolland, Saint-Orens de Gameville, all of France

[73] Assignee: Societe pour l'Equipement de Vehicules (S.E.V.), Issy-les-Moulineaux, France

[21] Appl. No.: 197,613

[22] Filed: Oct. 16, 1980

[30] Foreign Application Priority Data

Oct. 18, 1979 [FR] France .............................. 79 25950

[51] Int. Cl.³ .............................................. G01F 1/70
[52] U.S. Cl. ................................ 73/861.05; 73/861.32
[58] Field of Search ........... 73/861.05, 861.32, 861.33, 73/505, 204; 137/812, 813

[56] References Cited

U.S. PATENT DOCUMENTS

| | | | |
|---|---|---|---|
| 2,518,149 | 8/1950 | Kearsley | 73/861.32 |
| 3,019,647 | 2/1962 | Beard et al. | 73/861.05 |
| 3,261,209 | 7/1966 | Rae | 73/505 |
| 3,827,297 | 8/1974 | Griverus | 73/861.32 |
| 3,872,304 | 3/1975 | Little | 73/861.32 |

*Primary Examiner*—Herbert Goldstein
*Attorney, Agent, or Firm*—Larson & Taylor

[57] ABSTRACT

A flowmeter comprises a chamber having a rotational symmetry about an axis, provided with a tangential fluid inlet and an axial outlet. The outlet and inlet means cooperate for generating a vortex upon circulation of fluid through the chamber; a speed detector comprises at least one transmitting thermo-element and one receiving thermo-element angularly spaced about the said axis and located in a zone where the circumferential speed of the vortex is proportional to the flow rate.

6 Claims, 6 Drawing Figures

VORTEX FLOW RATE MEASURING DEVICE

BACKGROUND AND SUMMARY OF THE INVENTION

The present invention relates to a volume flowmeter for fluids in which a vortex is generated. It relates more particularly to a volume flowmeter of the kind comprising a chamber having a rotational symmetry about an axis, provided at its periphery with means for tangential inflow of fluid and means for axial outflow of the fluid, disposed so as to generate a vortex, and means for measuring the fluid velocity in the vortex.

There is a number of volume flowmeters designed so that there is formed therein a vortex presenting, at least locally, a rotational speed substantially proportional to the rate of flow and comprising a rotational speed sensor. Most of the existing devices have one or more of the following disadvantages: they impose on the fluid a considerable pressure drop; their response is not sufficiently proportional; they are sensitive to erratic flow fluctuations; they use mobile elements.

It is an object of the present invention to provide a device of simple construction, which comprises static elements only and is insensitive to vibrations, to shocks and to rapid flow fluctuations.

In practicing the invention, a device of the above-defined kind has a speed detector which comprises at least one transmitting thermo-element and one receiving thermo-element angularly offset about the axis and situated in a zone where the circumferential speed of the vortex is substantially proportional to the flow, means for applying short electric heating pulses to the transmitting thermo-element and means for detecting the arrival of pulse heated fluid in contact with the receiving thermo-element.

The flowmeter typically comprises a case limiting a chamber placed in the path of the fluid whose flow rate is to be measured and associated electronic means. The case may comprise, about the chamber, an annular upstream tranquilization enclosure and two downstream tranquilization enclosures into which the chamber opens axially through two converging portions. To form the vortex in the chamber, the upstream tranquilization enclosure communicates with this latter through at least one slit parallel with the axis or through holes directing the fluid in a direction having a tangential component.

The thermo-elements will generally be supported by an axial cylindrical insulating body which extends beyond the chamber and passes through the downstream tranquilization chambers. The respective diameters of the chamber and of the axial body and the distance which separates the body from the thermo-elements, advantageously formed by wires parallel to the axis, are chosen so that there is an at least approximate proportionality between the flow and the rate at which the thermo-elements are swept by the fluid.

The means may comprise a circuit for measuring the time gap between application of the electric pulses and detection by the receiving thermo-element. In this case, the pulses will generally be applied at a constant frequency, determined by a clock. Electronic means may be provided for applying an electrical heating pulse in response to the detection, the frequency of the heating pulses being then proportional to the rotational speed and therefore to the flow rate.

The invention will be better understood from reading the description which follows of particular embodiments of the device given by way of example.

SHORT DESCRIPTION OF THE DRAWINGS

FIG. 1 is a diagram showing the mechanical part of the flowmeter, in section along a plane passing through the axis of the vortex formation chamber, FIG. 2 is a sectional view along line II—II of FIG. 1, FIG. 3 is a diagram of electronic means associated with the mechanical part shown in FIGS. 1 and 2 to form the flowmeter, FIG. 4 is a chronogram showing the form of the signals which appear at the points of the diagram of FIG. 3 designated by the reference letters reproduced on each line of FIG. 4, FIG. 5, similar to FIG. 3, shows a modified embodiment, FIG. 6, similar to FIG. 4, is a chronogram showing the signals which appear at the points of the diagram of FIG. 5 designated by the reference letters which are reproduced on each line of FIG. 6.

DETAILED DESCRIPTION OF PARTICULAR EMBODIMENTS

Figure 1:
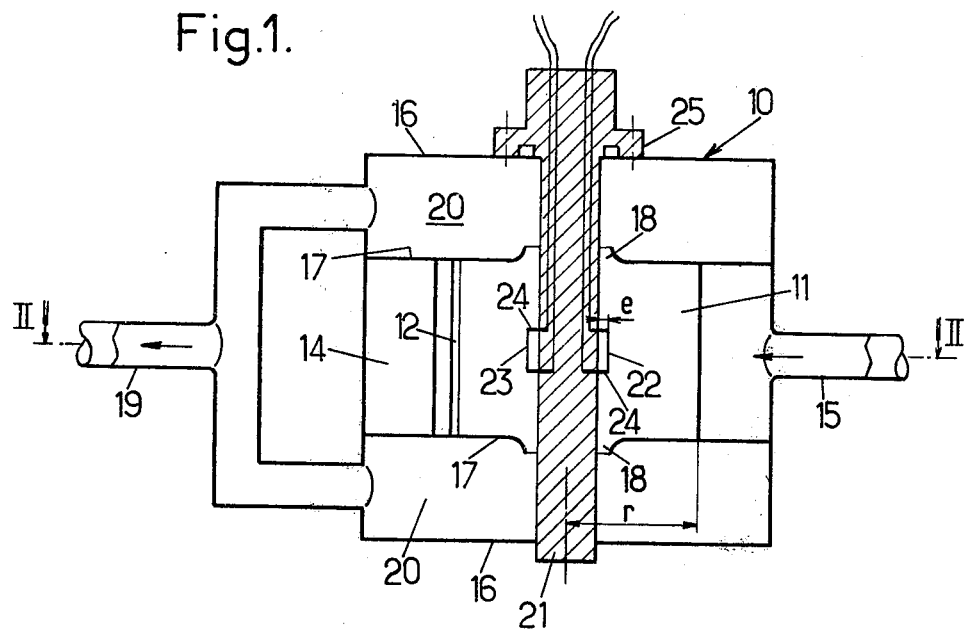
Figure 2:
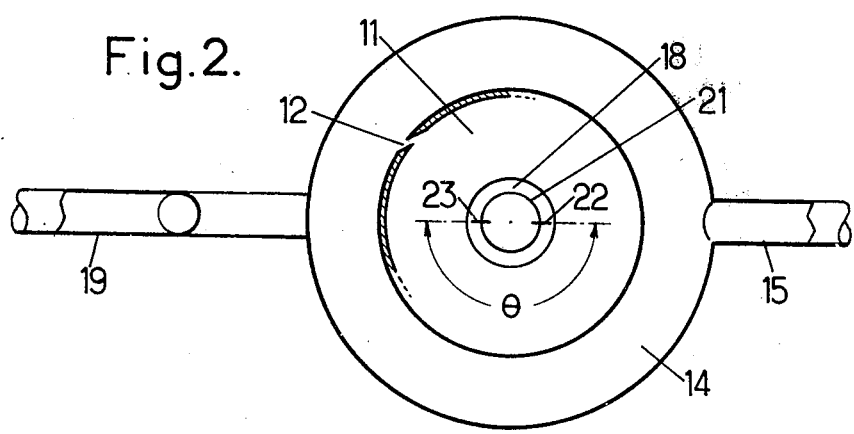

The flowmeter shown schematically in FIGS. 1 and 2 comprises a case 10 made from several assembled parts in which there is provided an annular chamber 11 having a rotational symmetry, whose lateral wall is provided with tangential fluid introduction means formed by an injection slit 12. The slit, which may be replaced by tangential fluid injection holes evenly distributed about the axis, is supplied by an upstream tranquilization enclosure 14 also provided in the case. Duct 15 conveying the fluid whose flow it is desired to measure opens into enclosure 14.

The end walls of chamber 11 are formed by two flanges 17 disposed symmetrically with respect to the median plane of the chamber, each having a central outlet orifice 18 whose edges form advantageously a converging portion, as shown in FIG. 1. Flanges 17 define, with the end faces 16 of case 10, two downstream tranquilization enclosures 20 connected to a discharge duct 19 for the fluid. A central cylindrical body 21 coaxial to the enclosures 20 and chamber 11 passes therethrough from one side to the other. This body 21 carries the speed detector, formed by two rectilinear thermo-elements 22 and 23 disposed parallel to the axis, at a distance e from body 21 and at an angular distance $\theta$ (FIG. 2). The thermo-elements 22 and 23 will generally be formed by two rectilinear thermo-resistive wires each supported by two radial metal pins 24. The assembly formed by body 21 and the speed detector will be advantageously removably mounted. In the illustrated embodiment, it is provided with a flange 25 adapted to be sealingly fixed to one of the faces 16. The connecting wires between the thermo-elements 22 and 23 and the measuring means may be embedded inside body 21.

The axial height of chamber 11, the diameter of the outlet orifice 18, the diameter of body 21, the length of slit 12 (or the number and arrangement of the holes which replace it), the distance e from the thermo-elements 22 and 23 to the central body 21 are chosen as a function of the radius r of chamber 11 so that the circumferential speed of the fluid which sweeps the thermo-elements 22 and 23 is proportional at all times to the measured flow. These dimensions may be readily determined by experiment.

Under these conditions, when fluid passes from duct 15 to duct 19, a limit layer of rotation sustained by the flow from slit 12 develops against the wall of this latter. The flow in this limit layer is three-dimensional, since the streams must assume a helical movement to pass out through orifices 18. A substantial fraction of the flow from slit 12 passes along the lateral wall of chamber 11 then flanges 17 before escaping through orifices 18.

Another fraction of the flow is directed helically towards the central body 21, in the central part of a flow having a rotation movement where viscosity and turbulences only occur feebly.

In this central region, the flow in the vicinity of the median plane of chamber 11 may be considered as a vortex in which the circumferential speed, which is accompanied only by low radial and longitudinal speeds, is approximately inversely proportional to the distance to the axis of rotation.

Against the wall of central body 21 appears a helical boundary layer symmetrical with respect to the median plane. So that thermo-elements 22 and 23 may be swept by fluid whose speed is proportional to the flow, they must be placed external to the boundary layer which implies an appropriate value of e.

If the dimensions of the chamber and of the orifices are correctly proportioned, the limit layers on the lateral wall of chamber 11 and against body 21 are of a small thickness and the circumferential speed of the fluid at the level of thermo-elements 22 and 23 is stable, these thermo-elements being placed in a potential flow zone outside the limit layers. By appropriate adjustment of the width of the slit or of the slits 12, satisfactory proportionality is obtained between the sweeping speed and the volume flow of the fluid for a wide range of flows and viscosities.

Slit 12 has obviously an essential role in so far as the behaviour of the limit layer along the lateral wall of chamber 11 is concerned. But, it further ensures efficient filtering of the fluctuations of upstream origin through the acceleration which it imposes on the tranquilized flow in enclosure 14. Orifices 18 play a similar role with respect to fluctuations originating downstream, through the local overspeed which they impose.

The measuring means associated with the thermo-elements 22 and 23 are provided for estimating the tangential speed at distance e from body 21 by thermoconvection. The means apply to the transmitting thermo-element 22 periodic electric heating pulses. The rotating fluid conveys the heat energy thus produced and a fraction thereof is collected by receiving thermo-element 23 used as a thermometer. The transit time separating the application of the heating pulse from the reception provides an indication inversely proportional to the speed of the fluid.

The measuring means may be of various types. In the embodiment shown in FIG. 3, means are provided to deliver an analog signal with an amplitude proportional to the transit time and so inverse of the flow rate.

Figure 3:
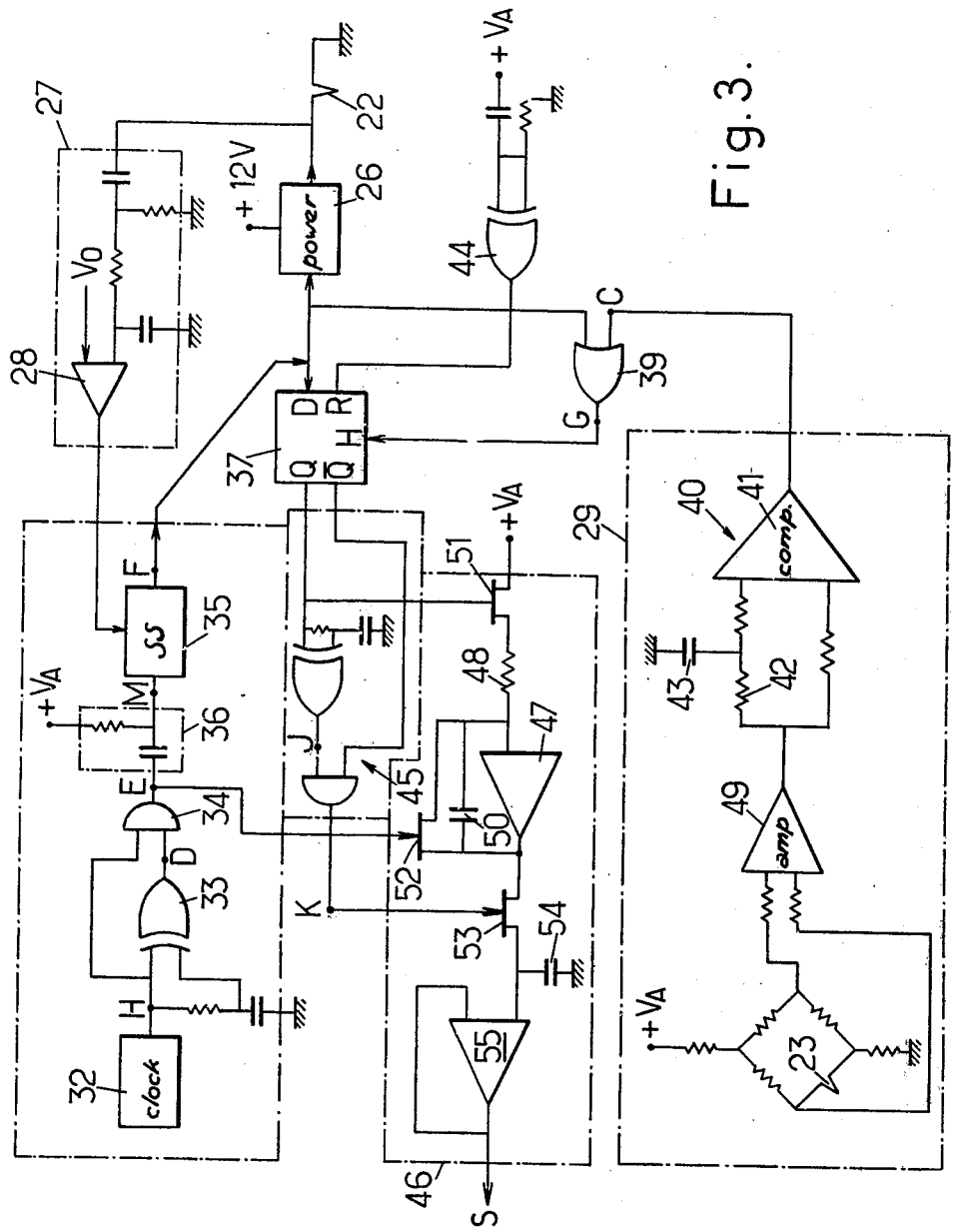

The measuring means shown in FIG. 3 are electronic and may be considered as comprising: a power circuit for supplying the pulses for heating the transmitting thermo-element 22; an analog circuit for detecting and amplifying the signal supplied by the receiving thermo-element 23; logic circuits for sequencing and synchronizing the pulses and for determining the transit time of the heat pulses; and finally a display system.

The power circuit 26 may be formed by a Darlington circuit preceded by an impedance matching transistor. It receives at its input control pulses from the synchronizing logic circuit and supplies, at its output, pulses for heating thermo-element 22 of the same duration as the signals it receives. Circuit 26 may be associated with a protection circuit for avoiding destruction of thermo-element 22 by overloading. The protection circuit 27 comprises a comparator 28 which receives, at one input, a reference voltage $V_O$ and, at the other input, the heating voltage of the thermo-element 22. Comparator 28 connected to the synchronizing logic circuit interrupts the heating pulse as soon as the voltage at the terminals of the thermo-element exceeds a predetermined value.

The detection and amplification circuit 29 comprises a Wheatstone bridge fed with a stabilized and filtered voltage $+V_A$ to avoid the disturbances due to the current drain during heating. In practice, with thermo-elements formed by usual wires, the sensitivity of the bridge will at the output be in the mV/°C. range. The diagonal voltage of the bridge is applied to an amplifier 49 which drives a comparator 40. This latter comprises a resistance-capacity network and an amplifier 41. The cut-off frequency of the filter formed by resistor 42 and capacitor 43 is chosen so that the slow output voltage variations of 29 (due for example to temperature variations of the fluid) are transmitted without attenuation. On the other hand, the rapid variations, due to the reception of the thermal pulse by the receiving thermo-element 23, are attenuated by the filter: the imbalance thus produced causes triggering of comparator 40.

The logic circuits comprise a sequencing and synchronizing part. This latter comprises a fixed frequency clock 32. The output clock signals are applied, through a shaping circuit comprising an EXCLUSIVE OR gate 33 and an AND gate 34, to a monostable 35 whose set time in the unstable state determines the duration of application of the heating pulse. The output of this monostable is connected to the input of power circuit 26. A derivating circuit 36 is interposed in its input so that the monostable is triggered in response to the trailing edge of the pulses from AND circuit 34. The output of protection circuit 27 is connected to the "clear" input of the monostable.

The part of the logic circuits for determining the transit time comprises a type D flip-flop 37 which receives the heating pulses from circuit 35 at its D input and the pulses from detection circuit 29 at its clock input H. An OR gate 39, whose second input is connected to the output of monostable 35, is connected between circuit 29 and the clock input of flip-flop 37. Thus, this clock input receives, on the one hand, the hot fluid passage detection pulses supplied by circuit 29 and, on the other hand, the heating pulse control pulses.

So as to ensure initialization of the device when the circuit is switched on, the reset input of flip-flop 37 is associated with an EXCLUSIVE OR gate 44, one of whose inputs is connected to the voltage $+V_A$.

Components of the logic circuits for measuring the transit time comprise further a shaping circuit 45 based on EXCLUSIVE OR and AND gates connected to the Q and Q outputs of flip-flop 37. The output of shaping circuit 45 drives the display system.

A simple solution consists in using as output signal, either the signals appearing at the Q output of flip-flop 37, formed of square waves whose duration is equal to the transit time of the heat pulse, (inversely proportional to the flow to be measured) or the output signals of the shaping circuit 45 whose frequency is inversely proportional to the flow rate. The display may then be very simple.

In the embodiment illustrated in FIG. 3, the display system 46 supplies an analog voltage proportional to the transit time. This system 46 comprises an analog integrator formed by an amplifier 47 driven through a resistor 48 and looped through a capacitor 50. This integrator circuit generates a linear ramp during the duration of the transit time, i.e. during the whole of the period when the field effect transistor 51 is enabled by the Q output of flip-flop 37. Resetting is effected by means of a transistor 52 controlled by the output square wave of gate 34. At the end of each measurement, the ramp voltage is stored until the next measurement by a sample and hold circuit comprising a field effect transistor 53 controlled by the shaping circuit 45, a capacitor 54 and an output amplifier 55.

Figure 4:
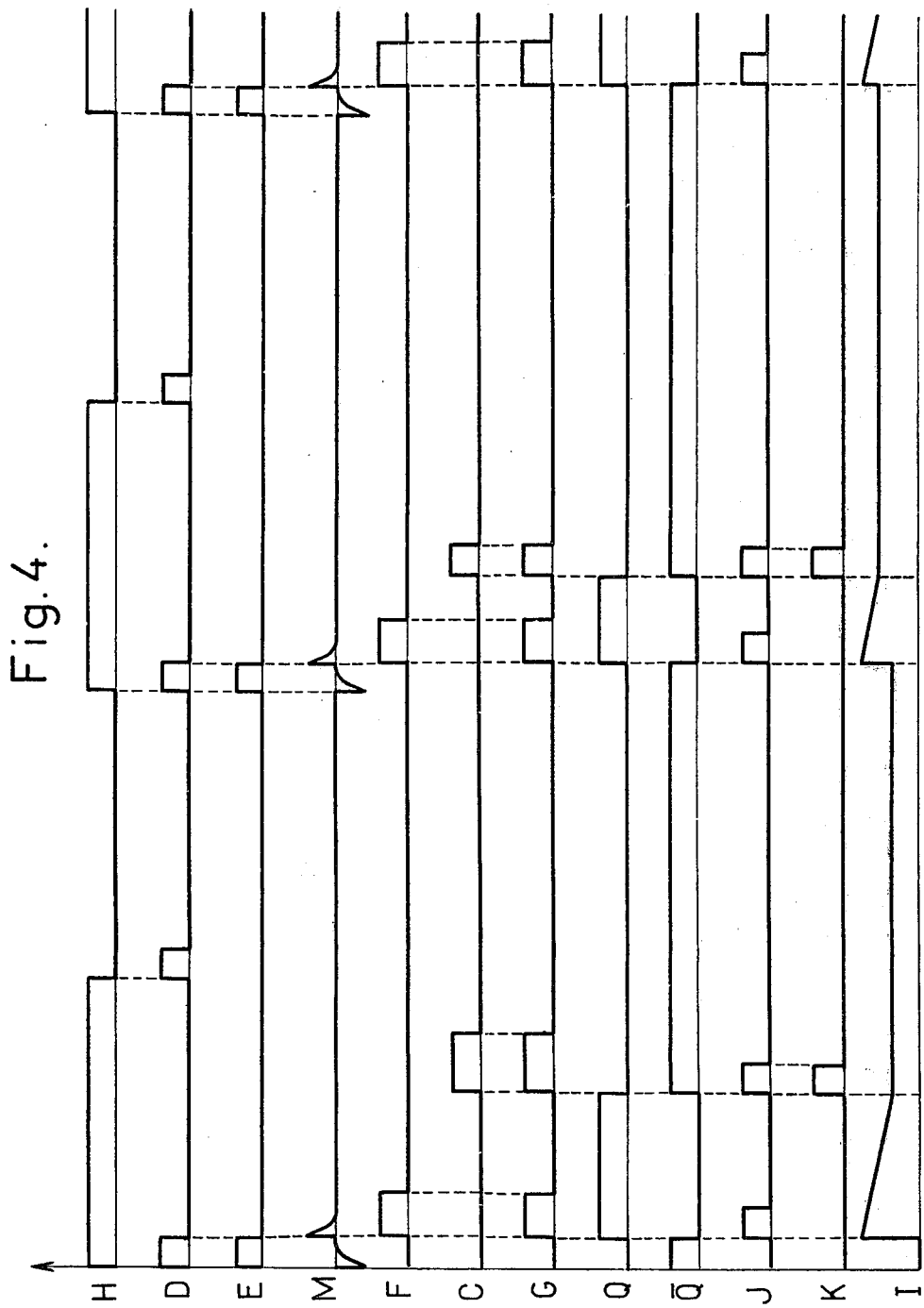

The operation of the device of FIG. 3 appears in the chronogram of FIG. 4 each line of which shows the signals which appear at the point of the diagram of FIG. 3 designated by the same letter.

Figure 5:
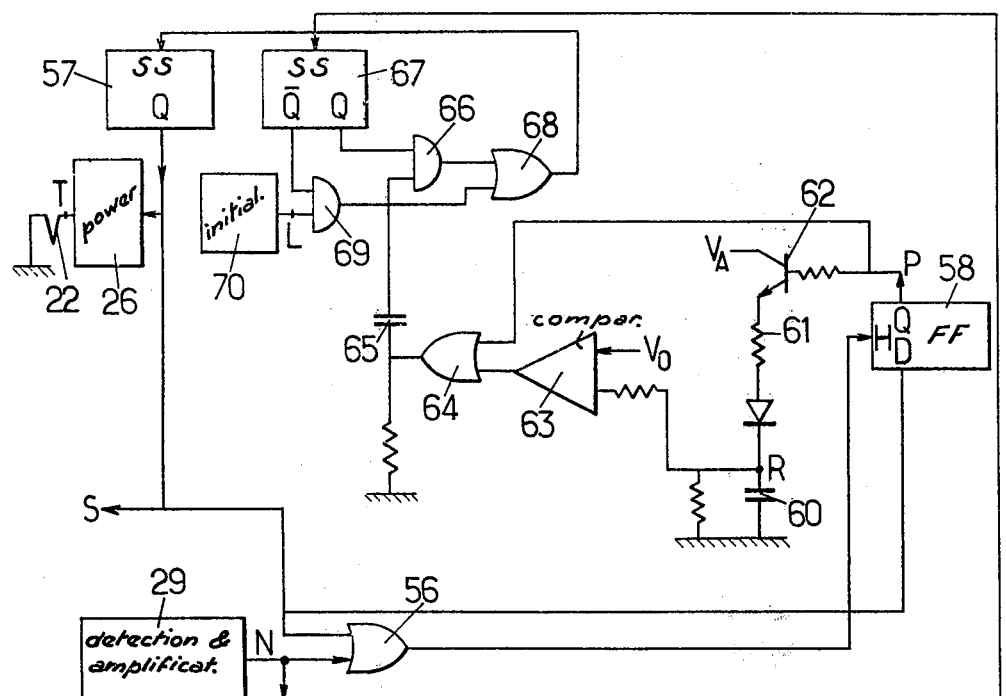

In the variation shown schematically in FIG. 5, where the components corresponding to those already described bear the same reference number, the output of the detection and amplification circuit 29 is fed back to the sequencing part of the logic circuits, so as to apply a new heating pulse to thermo-element 22 as soon as there has been reception of a signal. Thus, the freqency of repetition of the heating pulses is directly proportional to the flow rate to be measured.

However, this frequency is limited by the thermal inertia of the transmitting thermo-element 22 which must come back to a temperature close to that of the fluid so as to be able to deliver an identifiable heat pulse. If components available at the present time are used, it is difficult to exceed a repetition frequency of about 10 Hertz.

However, such a mode of operation is interesting because it gives a linear indication depending on the flow. Among possible applications there may be mentioned the construction of a consumption totalizer for an internal combustion engine.

In the embodiment illustrated in FIG. 5, a detection and amplification circuit 29 drives an OR gate 56 whose other input receives the heating control pulses supplied by the controlled trigger 57, formed by a monostable. The OR gate transmits to the clock input H of a type D flip-flop 58 the pulses received at one or other of its inputs.

The D input of the flip-flop is connected to the output of trigger 57 so as to be set at the beginning of each heating pulse. Its Q output is connected to a delay multiplying circuit taking into account the impossibility of extending the transit duration of the heat pulse, the angular distance $\theta$ between transmitting thermo-element 22 and receiving thermo-element 23 not being able to be increased unduly. This delay multiplier comprises a capacitor 60 associated with a circuit which charges it linearly during the duration of the transit of the heat pulse. This circuit comprises a resistor 61 and a transistor 62 enabled for the duration of the square wave appearing at the Q output of flip-flop 58. The output of the delay multiplier drives a comparator 63 in which the charge voltage of capacitor 60 is compared with a reference voltage $V_O$. The output voltage of comparator 63 is applied to an OR gate 64 whose other output is connected to the Q output of flip-flop 58. The output pulses of OR gate 64 are applied, through a capacitor 65, to an AND gate 66. This latter receives, at its second input, the Q output of a reconductible monostable 67 (pulse stretcher) whose positioning input receives the detection pulses supplied by circuit 29. An OR gate 68 sets monostable flip-flop 67 in response either to the output pulses of gate 66 (when the delay multiplier sends out a pulse while monostable 67 is set) or in response to the pulses from an AND gate 69 (through the action of an initialization circuit 70 while monostable 67 has come back to zero).

Figure 6:
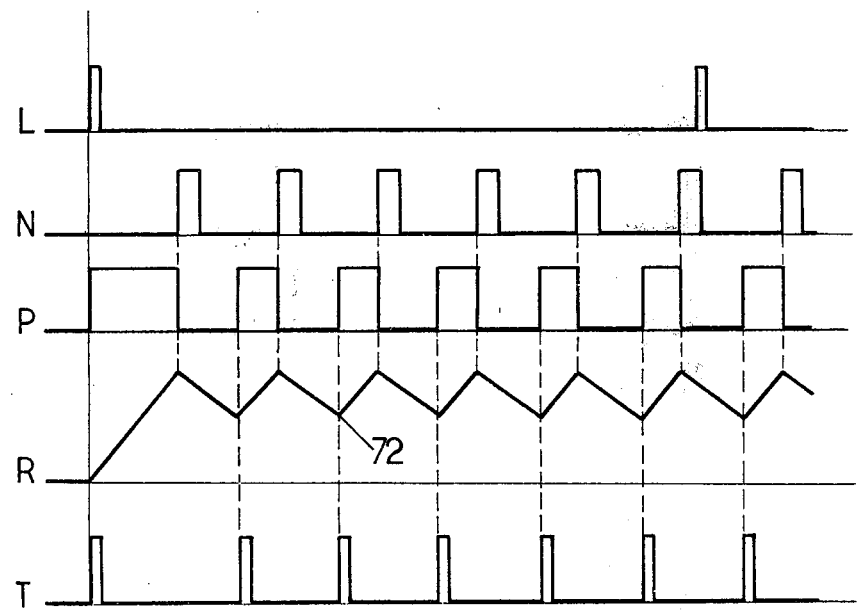

The signals which appear at different points of the device of FIG. 5 are indicated in FIG. 6. Initialization circuit 17 emits for example pulses with a period of a few seconds, three seconds for example. In response to each detection pulse (line N), the Q output of flip-flop 58 returns to zero (line P) and the charging of capacitor 60 ceases (line R). The capacitor is discharged substantially linearly after being charged linearly, until the moment when comparator 63 triggers (point 72), causing monostable 57 to come into an unstable position and the appearance of a heating pulse (line T). Since the output frequency cannot readily exceed 10 Hz, the set time duration of monostable 57 in the unstable position, and so the width of the heating pulses (line T) will generally be a few milliseconds.

The invention may be used in a number of systems; for instance, it may constitute a simple device for measuring fuel consumption of an engine. The device is hardly sensitive to unsteady operating conditions, because of the incidence of two time constants, one related to the duration of the travel of the fluid particles at the boundary of the limit layer along the lateral wall 11 and the other to the slowing down of the rotating body in potential flow between the two limit layers. Thus, the low frequency flow fluctuations are filtered out. Furthermore, spatial integration of the variations of the speed in the field of measurement may be effected, and the signal/noise ratio may be improved by dimensioning the wires for them to extend along a substantial portion of the axial size of chamber 11.

We claim:

1. A flowmeter for measuring the rate of volumetric flow of a fluid comprising: a chamber having a rotational symmetry about an axis; fluid inlet means formed at the periphery of said chamber; fluid outlet means for axial flow of said fluid out of said chamber, cooperating with said inlet means for generating a vortex in said chamber upon circulation of said fluid through said chamber; and speed detector means comprising a transmitting thermo-element wire and a receiving thermo-element wire, said wires being parallel to said axis, angularly spaced about said axis and located at the same distance from said axis in a zone where the circumferential speed of the vortex is substantially proportional to the flow rate, further comprising means for applying short electrical heating pulses to the transmitting thermo-element wire and means for detecting the arrival of the pulse heated fluid in contact with the receiving thermo-element wire.

2. A flowmeter for measuring the rate of volumetric flow of a fluid comprising: a chamber having a rotational symmetry about an axis; fluid inlet means formed at the periphery of said chamber; fluid outlet means for axial flow of said fluid out of said chamber, cooperating with said inlet means for generating a vortex in said chamber upon circulation of said fluid through said chamber; and speed detector means comprising at least one transmitting thermo-element and one receiving thermo-element angularly spaced about said axis and located in a zone where the circumferential speed of the vortex is substantially proportional to the flow rate, further comprising means for applying short electrical heating pulses to the transmitting thermo-element and means for detecting the arrival of the pulse heated fluid in contact with the receiving thermo-element wherein said chamber is surrounded radially by an annular upstream tranquilization enclosure and said outlet means comprises two axially directed convergent portions opening into respective downstream tranquilization enclosures.

3. Flowmeter according to claim 2, wherein said inlet means communicating said upstream tranquilization enclosure with said chamber comprises at least one slit parallel to the axis or a plurality of holes directing the fluid in a substantially tangential direction.

4. A flowmeter for measuring the rate of volumetric flow of a fluid comprising: a chamber having a rotational symmetry about an axis; fluid inlet means formed at the periphery of said chamber; fluid outlet means for axial flow of said fluid out of said chamber, cooperating with said inlet means for generating a vortex in said chamber upon circulation of said fluid through said chamber; and speed detector means comprising at least one transmitting thermo-element and one receiving thermo-element angularly spaced about said axis and located in a zone where the circumferential speed of the vortex is substantially proportional to the flow rate, further comprising means for applying short electrical heating pulses to the transmitting thermo-element and means for detecting the arrival of the pulse heated fluid in contact with the receiving thermo-element, wherein the thermo-elements are carried by a cylindrical insulating axial body which projects throughout said chamber.

5. Flowmeter according to any one of claims 1 to 4, wherein the speed detector means comprises a circuit for measuring the time delay between each application of an electrical pulse and the corresponding detection.

6. Flowmeter according to any one of claims 1 to 4, wherein the speed detector means comprises a circuit for applying an electrical heating pulse in response to the detection and means for measuring the frequency of the heating pulses.

* * * * *